US008996200B2

(12) United States Patent
Gautama et al.

(10) Patent No.: US 8,996,200 B2
(45) Date of Patent: Mar. 31, 2015

(54) IN-VEHICLE FUNCTIONS USING SHORT-RANGE COMMUNICATIONS

(71) Applicant: GM Global Technology Operations LLC, Detroit, MI (US)

(72) Inventors: Neeraj R. Gautama, Whitby (CA); Amanda J. Kalhous, Ajax (CA)

(73) Assignee: GM Global Technology Operations LLC, Detroit, MI (US)

(*) Notice: Subject to any disclaimer, the term of this patent is extended or adjusted under 35 U.S.C. 154(b) by 62 days.

(21) Appl. No.: 13/664,890

(22) Filed: Oct. 31, 2012

(65) Prior Publication Data
US 2013/0289800 A1 Oct. 31, 2013

Related U.S. Application Data

(60) Provisional application No. 61/639,513, filed on Apr. 27, 2012.

(51) Int. Cl.
*G06F 17/00* (2006.01)
*B60Q 1/00* (2006.01)
*B60Q 3/00* (2006.01)
*B60N 2/00* (2006.01)
*B60R 16/037* (2006.01)

(52) U.S. Cl.
CPC .............. *B60N 2/002* (2013.01); *B60R 16/037* (2013.01)
USPC ................................. 701/2; 340/449; 340/501

(58) Field of Classification Search
CPC ........... G06F 17/00; G06F 15/16; H04W 4/04
USPC ....................................... 701/2; 340/449, 501
See application file for complete search history.

(56) References Cited

U.S. PATENT DOCUMENTS

| 7,518,502 | B2* | 4/2009 | Austin et al. ............... 340/539.1 |
| 2008/0177898 | A1* | 7/2008 | Delia et al. .................... 709/250 |
| 2011/0254687 | A1* | 10/2011 | Arponen et al. .............. 340/540 |
| 2011/0301780 | A1* | 12/2011 | Miller et al. ....................... 701/1 |
| 2011/0307891 | A1* | 12/2011 | Orr et al. ........................ 718/100 |
| 2012/0071151 | A1* | 3/2012 | Abramson et al. ............. 455/418 |
| 2013/0054051 | A1* | 2/2013 | Cuddihy et al. ................... 701/2 |
| 2013/0099940 | A1* | 4/2013 | Protopapas .................... 340/904 |

FOREIGN PATENT DOCUMENTS

| CN | 101844548 A | 9/2010 |
| CN | 102170299 A | 8/2011 |

OTHER PUBLICATIONS

Chinese Office Action for Appl. No. 201310149677.7, Issued Feb. 2, 2015, 9 pages.

* cited by examiner

*Primary Examiner* — Yonel Beaulieu
*Assistant Examiner* — Martin Weeks
(74) *Attorney, Agent, or Firm* — Cantor Colburn LLP

(57) ABSTRACT

In-vehicle functions are implemented using a location device disposed in a vehicle, a central controller of the vehicle, and logic executable by a computer processor of the central controller. The location device includes a wireless communications interface. The logic receives a unique identifier of the location device. The unique identifier identifies a location in the vehicle in which the location device is disposed. The logic also validates the location device and an end user device in response to activation of the location device by the end user device via the communications interface. The logic further receives a request from the end user device to implement end user-configured settings for an electronic component that services the location in the vehicle corresponding to the unique identifier and activates the electronic component based on the end user-configured settings.

18 Claims, 4 Drawing Sheets

IN-VEHICLE FUNCTIONS USING SHORT-RANGE COMMUNICATIONS

CROSS-REFERENCE TO RELATED APPLICATION

This patent application claims priority to U.S. Provisional Patent Application Ser. No. 61/639,513 filed Apr. 27, 2012, which is hereby incorporated herein by reference in its entirety.

FIELD OF THE INVENTION

The subject invention relates to communications and, more particularly, to in-vehicle functions using short-range communications.

BACKGROUND

Vehicles today provide many features directed toward enhancing the operator and passenger experience. Additionally, some of these features provide functionality that is targeted to specific passenger locations, such that each passenger may adjust certain settings in his/her area of the vehicle cabin. When an individual enters a vehicle, the individual selects available controls therein for adjusting these features, such as seat positioning, heating, ventilation, and air conditioning (HVAC), entertainment options, and lighting, to name a few.

It would be desirable to provide a way for the vehicle to recognize a particular passenger and initiate directed functions through the vehicle based on the individual preferences of the passenger.

SUMMARY OF THE INVENTION

In one exemplary embodiment of the invention a system for implementing in-vehicle functions using short-range communications is provided. The system includes a location device disposed in a vehicle. The location device includes a wireless communications interface. The system also includes a central controller of the vehicle. The central controller includes a computer processor and logic executable by the computer processor. The logic is configured to implement a method. The method includes receiving a unique identifier of the location device. The unique identifier identifies a location in the vehicle in which the location device is disposed. The method also includes validating the location device and an end user device in response to activation of the location device by the end user device via the communications interface. The method further includes receiving a request from the end user device to implement end user-configured settings for an electronic component that services the location in the vehicle corresponding to the unique identifier, and activating the electronic component based on the end user-configured settings.

In another exemplary embodiment of the invention, a method for implementing in-vehicle functions using short-range communications is provided. The method includes receiving, at a computer processor, a unique identifier of a location device disposed in a vehicle. The location device includes a wireless communications interface. The unique identifier identifies a location in the vehicle in which the location device is disposed. The method also includes validating the location device and an end user device in response to activation of the location device by the end user device via the communications interface. The method further includes receiving a request from the end user device to implement end user-configured settings for an electronic component that services the location in the vehicle corresponding to the unique identifier, and activating the electronic component based on the end user-configured settings.

In yet another exemplary embodiment of the invention a computer program product for implementing in-vehicle functions using short-range communications is provided. The computer program product includes a storage medium having computer program instructions embodied thereon, which when executed by a computer processor, cause the computer processor to implement a method. The method includes receiving a unique identifier of a location device disposed in a vehicle. The location device includes a wireless communications interface. The unique identifier identifies a location in the vehicle in which the location device is disposed. The method also includes validating the location device and an end user device in response to activation of the location device by the end user device via the communications interface. The method further includes receiving a request from the end user device to implement end user-configured settings for an electronic component that services the location in the vehicle corresponding to the unique identifier, and activating the electronic component based on the end user-configured settings.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
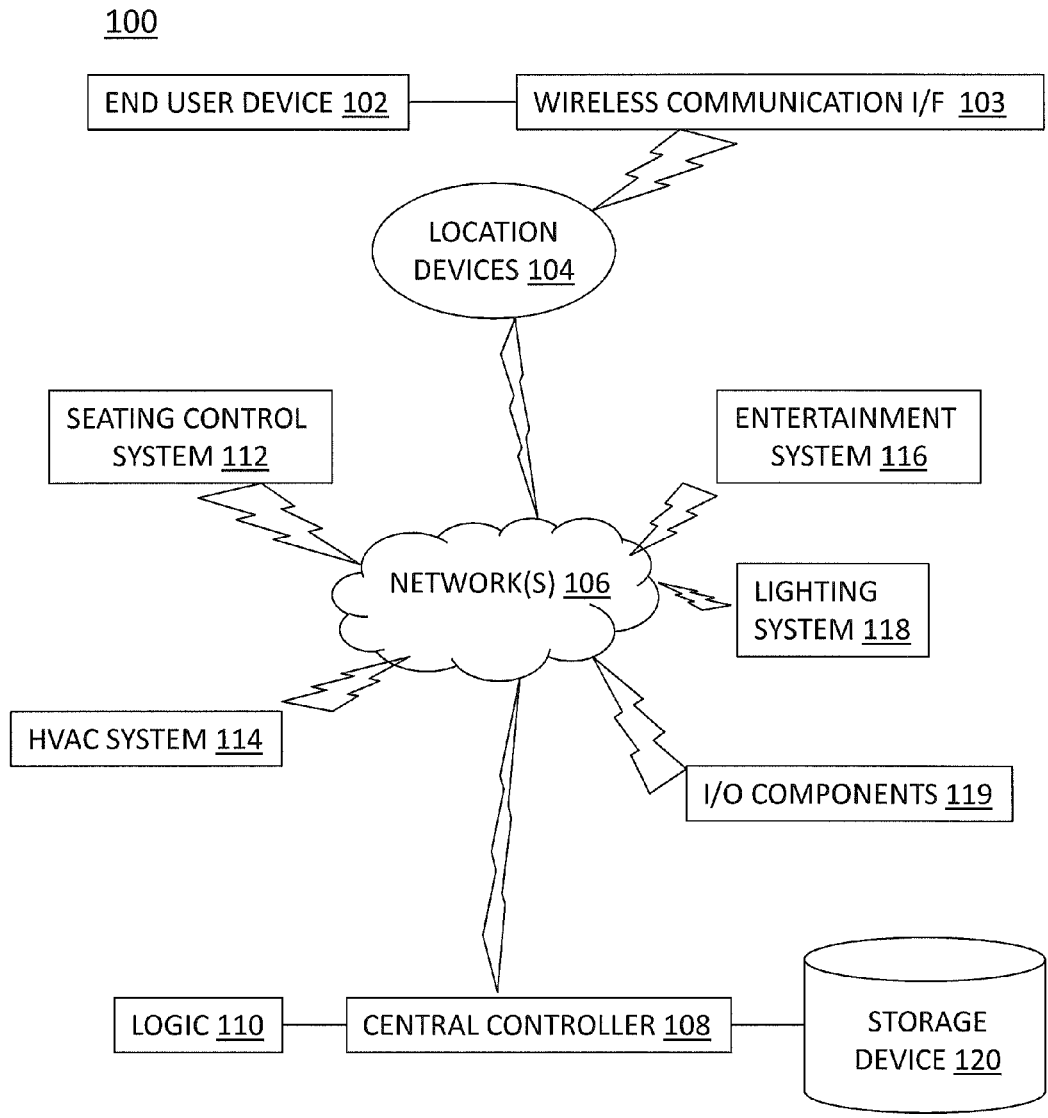
FIG. 1 is a block diagram of a system upon which in-vehicle functions using short-range communications may be implemented in accordance with an embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention in-vehicle functions using short-range communications (also referred to herein as "in-vehicle functions") are provided. The in-vehicle functions provide the ability to identify a particular operator or passenger of a vehicle and to initiate directed functions through the vehicle without passenger input. In one embodiment, the directed functions include adjusting various electronic components of the vehicle according to known passenger preferences. The directed functions may also include enabling a passenger's end user device to stream music from the end user device to the vehicle's entertainment system. The directed functions may also include enabling passenger end user devices to initiate hands free calling.

Turning now to FIG. 1, a system 100 upon which in-vehicle functions may be implemented will now be described in an exemplary embodiment. The system 100 includes various portions of a vehicle including components used in performing the in-vehicle functions. The vehicle may be any type of automobile known in the art. As shown in FIG. 1, the system 100 includes location devices 104 communicatively coupled to a central controller 108 via a vehicle network 106. The central controller 108 may include hardware, software, firmware, and related circuitry configured for managing various vehicle electronics, including various electronic devices, components and networks, particularly those described herein, and for communicating with the vehicle electronics. In an embodiment, the central controller 108 is implemented using one or more computer processing devices.

The location devices 104 include short-range, wireless communications devices that are dispersed in various passenger locations of the vehicle. For example, the location devices 104 may be affixed to, or integrated with, passenger seating or another structure otherwise associated with a passenger seating location. The location devices 104 include components that utilize any suitable short-range wireless communication technologies to communicate with end user devices, particular those as will be described further herein. In an embodiment, the short-range wireless communications technologies may include near field communications (NFC) standards, Wi-Fi, Bluetooth™ low energy, radio frequency identification (RFID), or a combination thereof.

The vehicle network 106 may be a physically wired network, a wireless network, or a combination thereof. In one embodiment, the vehicle network 106 is a local area network that communicatively couples electronic components of the vehicle with the central controller 108. The electronic components include, for example, a seating control system 112, HVAC system 114, entertainment system 116, lighting system 118, and input/output (I/O) components 119. Each of the electronic components includes electronic control units (not shown), which may be implemented in hardware including related circuitry, as well as logic for facilitating communications between the electronic components and the central controller 108.

The seating control system 112 includes physical controls for adjusting seat position for corresponding seats in the vehicle. The electronic control unit of the seating control system 112 receives signals via the physical controls as well as from the central controller 108 to perform a seat adjustment function (e.g., moving seat forward and backward, inclining and reclining seat back, lumbar support, side support, and raising and lowering seat). If the vehicle seating includes a heating component and/or a cooling component, the seat adjustment function may also include activating or adjusting the respective heating and/or cooling component.

The HVAC system 114 includes physical controls for adjusting the internal climate of designated portions of the vehicle or cabin area. The electronic control unit of the HVAC system 114 receives signals via the physical controls as well as from the central controller 108 to perform an HVAC function (e.g., activating and deactivating the HVAC system 114, and increasing or decreasing temperature through a heating unit, as well as an air conditioning unit, as well as associated valves and other HVAC components used for activating and deactivating selected modes, such as floor vents only, main cabin, and turning on and off the rear HVAC if no passenger is present).

The entertainment system 116 includes physical controls including various adjustment knobs, switches, graphical user interfaces and the like, for adjusting the functions of the entertainment system 116, such as turning on or off the system 116, increasing or decreasing audio volume levels, and tuning in preferred radio stations including applying radio presets for preferred radio stations. The electronic control unit of the entertainment system 116 facilitates entertainment functions, such as playing recorded media through the system 116. The entertainment system 116 also includes speakers or other output means to provide music or programming through the radio or recorded medium. In an embodiment, the entertainment system 116 also includes short-range communication technology (e.g., a Bluetooth™-enabled interface) for receiving music and content from another device in the vehicle, and presenting the music or content through the entertainment system 116.

The lighting system 118 includes physical controls including various adjustment knobs, switches, graphical user interfaces and the like, for adjusting lighting levels for corresponding areas in the vehicle. The electronic control unit of the lighting system 118 receives signals via the physical controls as well as from the central controller 108 to perform a lighting adjustment function (e.g., turning lights on and off, and dimming or brightening light levels).

One or more occupants of the vehicle may carry a portable device, referred to herein as end user device 102, which may be used in implementing the exemplary in-vehicle functions described herein. The end user device 102 may include a smartphone, tablet PC, watch, credit card, or key fob, to name a few.

The central controller 108 executes logic 110 for implementing the in-vehicle functions described herein. The central controller 108 is communicatively coupled to a storage device 120 that contains memory for storing presets and identifiers for location devices 104.

The end user device 102 includes a short-range wireless communication interface 103 for communicating with the location devices 104 and other vehicle components capable of receiving communications from the end user device 102, such as the entertainment system 116. In one embodiment, the wireless communication interface 103 of the end user device 102 employs near field communication (NFC) components using magnetic induction for implementing wireless communications with the location devices 104. In another embodiment, the wireless communication interface 103 and the location devices 104 employ radio frequency identification (RFID) components (e.g., RFID readers, memory, and antennae) for enabling these communications. In a further embodiment, the wireless communication interface 103 of the end user device 102 employs Bluetooth low energy components for implementing wireless communications with the location devices 104. In this embodiment, the location devices 104 are also configured as Bluetooth-enabled components (e.g., transceivers configured for use with Bluetooth protocols) for enabling these communications. In another embodiment, the end user devices 102 and the location devices 104 may employ a combination of the above wireless technologies.

In an embodiment, the logic 110 is preconfigured to establish and store identifiers for each location device 104 in the vehicle. Any unique identifier may be used for this purpose.

In an embodiment, a vehicle owner, operator, or passenger referred to herein as "end user") may configure customized preferences for the electronic components of the vehicle. The preferences may be stored in the storage device 120 of the vehicle or may be stored in the location devices 104 (e.g., if the location devices 104 are NFC-configured read/writeable tags). In an embodiment, the identifier of each of the location devices 104 is stored in a record, along with customized end user settings. The end user may configure these settings using a variety of techniques. In one embodiment, the logic 110 may be configured to provide an interface via a display device in the vehicle (e.g., one or more of the I/O components 119 of the vehicle). In this embodiment, the end user may be prompted via the interface on the display of the vehicle to select from available settings associated with the electronic components for the seating control system 112, the HVAC system, 114, the entertainment system 116, and the lighting system 118. The end user may be identified using any unique identification system (e.g., if the end user device 102 is a cellphone, the unique identifier may be the cellphone number). Alternatively, the logic 110 may be modified as a downloadable application on a cellphone, such as the end user device 102, whereby the application includes a similar interface, and the selected settings are wirelessly transferred to the corresponding location devices 104. A sample data structure format that may be used for storing these settings is shown below:

```
USER_ID1
    LOCATION_DEVICE_ID1
        ELECTRONIC_COMPONENT_SETTING1
        ELECTRONIC_COMPONENT_SETTING2...
        ELECTRONIC_COMPONENT_SETTINGn
    LOCATION_DEVICE_ID2...
    LOCATION_DEVICE_IDn...
USER_ID2...
USER_IDn
```

As indicated above, the in-vehicle functions provide the ability to identify a particular operator or passenger of a vehicle and to initiate directed functions through the vehicle. In one embodiment, the directed functions include adjusting various electronic components of the vehicle according to passenger preferences. The directed functions may also include enabling a passenger's end user device to stream music from the end user device to the vehicle's entertainment system. The directed functions may also include enabling passenger end user devices to initiate hands free calling.

Figure 2:
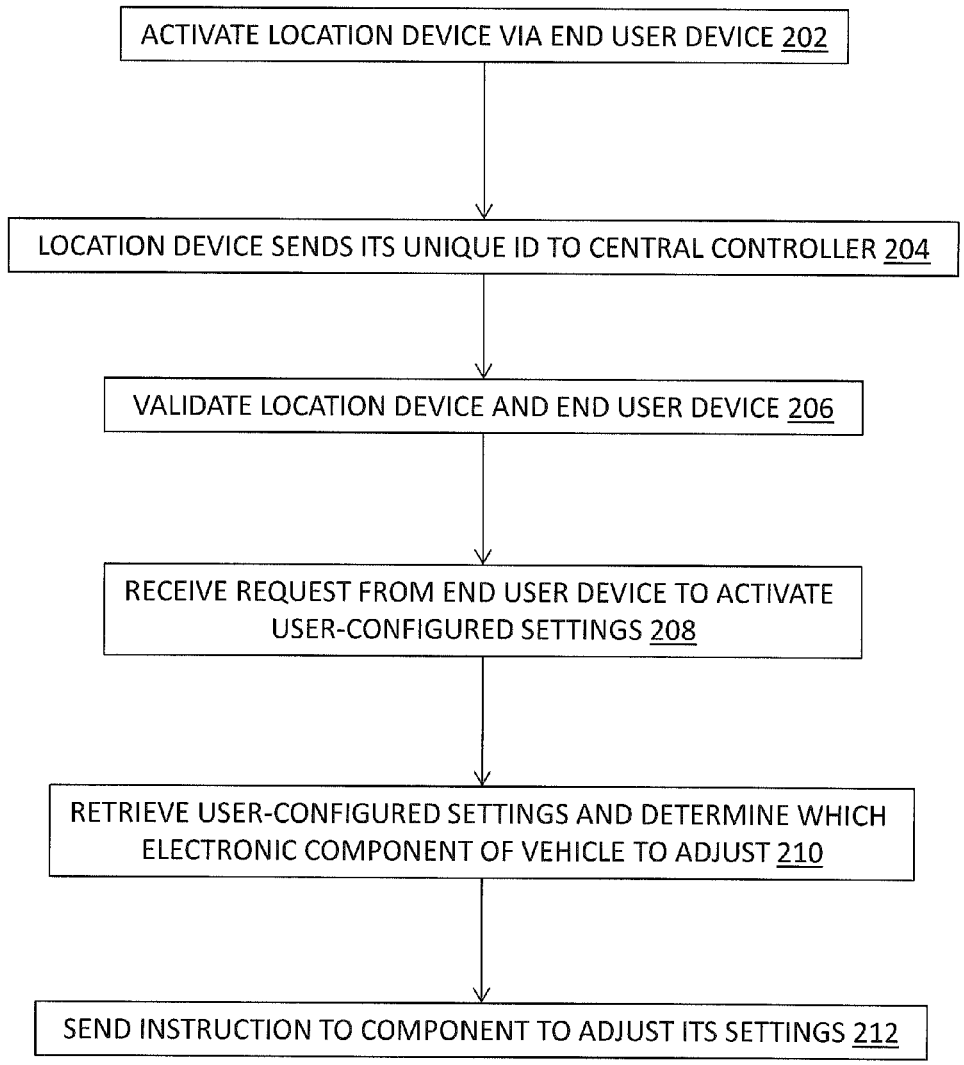
FIG. 2 is a flow diagram describing a process for implementing in-vehicle functions using short-range communications in accordance with an embodiment.

Turning now to FIG. 2, a flow diagram of a process for implementing in-vehicle functions in accordance with an embodiment will now be described. The process may begin at the initiation of a drive cycle or may begin at any time before, during, or after the drive cycle, so long as at least one passenger is in the vehicle. The vehicle may or may not be powered on.

At step 202, an end user activates a location device 104 via an end user device 102 via the wireless communication interface 103. In one embodiment, this is implemented using near field communications technologies by swiping or passing the end user device 102 over the location device 104 in the vehicle. Alternatively, as indicated above, this may be implemented using a wireless communication interface 103 that employs Bluetooth low energy (BTLE) protocols or other wireless technology.

At step 204, the location device 104 sends its unique identifier to the central controller 108 over the vehicle network 106. Thus, the method of FIG. 2 includes receiving, at a computer processor, a unique identifier of a location device disposed in a vehicle. The location device includes a wireless communications interface, and the unique identifier identifies a location in the vehicle in which the location device is disposed.

At step 206, the location device 104 and the end user device 102 are validated using any secure methods. Thus, the process of FIG. 2 includes validating the location device and an end user device in response to activation of the location device by the end user device via the communications interface.

At step 208, the central controller 108 receives a request from the end user device 102 to activate user-configured settings. Thus, the process of FIG. 2 includes receiving a request from the end user device to implement end user-configured settings for at least one electronic component that services the location in the vehicle corresponding to the unique identifier. The logic 110 retrieves the user-configured settings (also referred to as preset information) from the storage device 120 or other storage location using, e.g., a record that employs the aforementioned data structure, and determines which electronic component of the vehicle to adjust based on the preset information and the location device identifier at step 210. For example, if the location device identifier indicates the end user is sitting in the front passenger seat, the HVAC system 114 that controls that portion of the vehicle may be adjusted to the settings established for the end user (e.g., a climate control associated with a vent disposed in the front passenger side of the vehicle).

At step 212, the logic 110 instructs the associated electronic components to adjust their settings based on the location device identifier and the stored settings for the end user.

Figure 3:
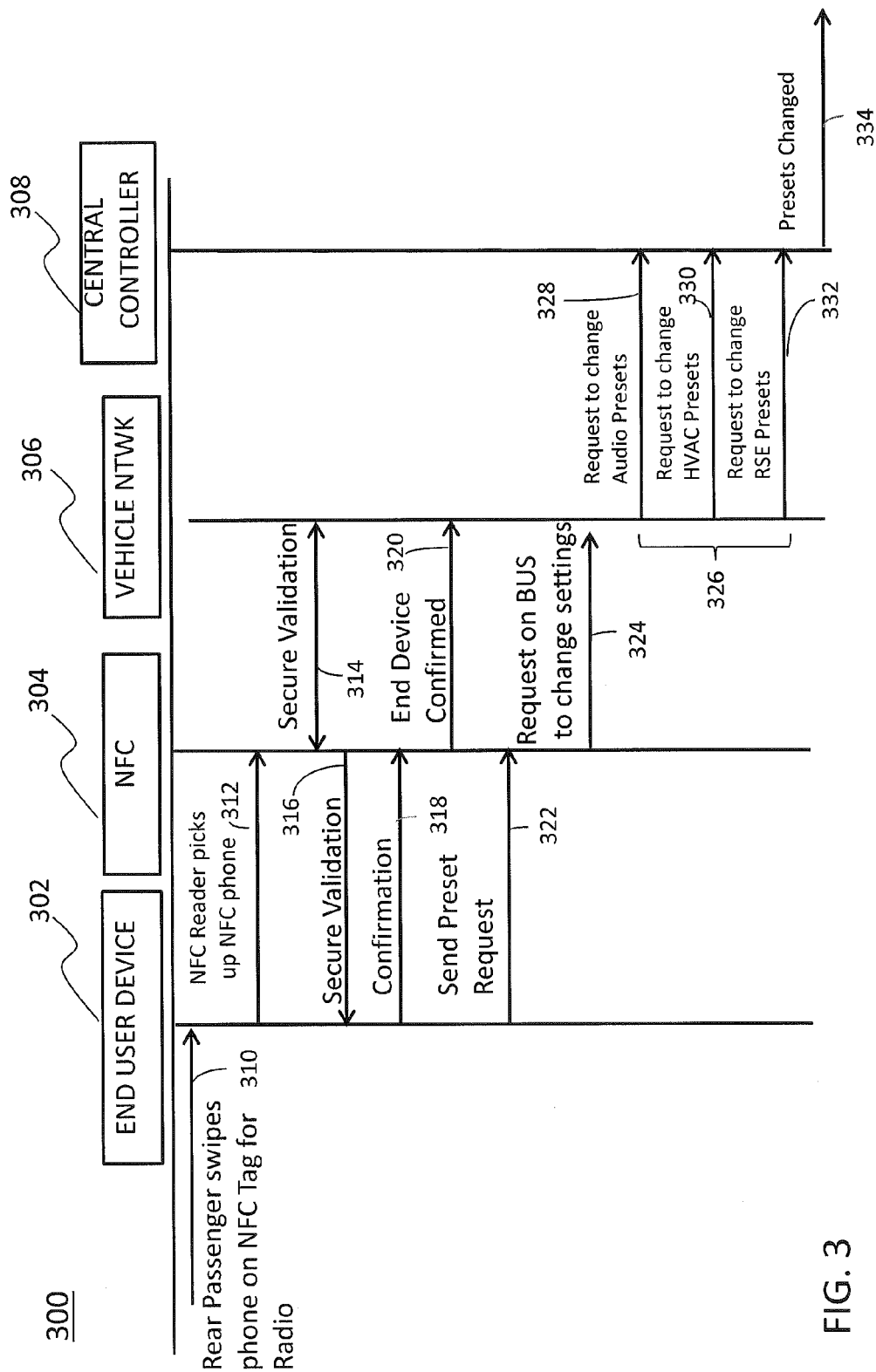
FIG. 3 is a sequence diagram of a process for implementing in-vehicle functions using short-range communications in accordance with an embodiment.
Figure 4:
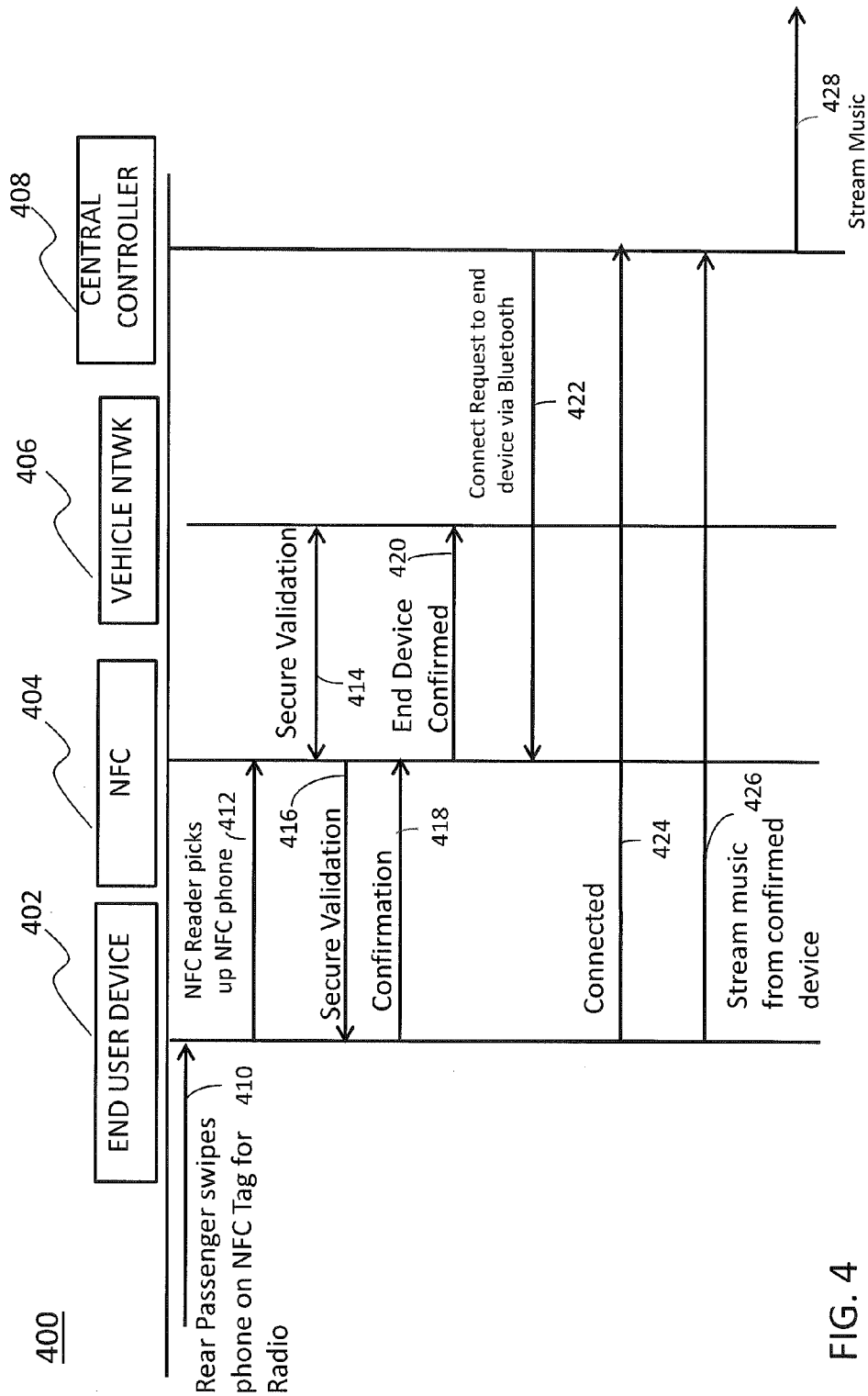
FIG. 4 is a sequence diagram of a process for implementing in-vehicle functions using short-range communications in accordance with another embodiment.

Turning now to FIGS. 3 and 4, sequence diagrams 300 and 400, respectively, depicting various use cases of the in-vehicle functions will now be described. End user devices 302 and 402 of FIGS. 3-4 correspond to the end user devices 102 of FIG. 1. In addition, NFC devices 304 and 404 of FIGS. 3-4 correspond to the location devices 104 of FIG. 1. Vehicle networks 306 and 406 correspond to the vehicle network 106 of FIG. 1. The central controllers 308 and 408 correspond to the central controller 108 of FIG. 1.

FIG. 3 illustrates a sequence diagram 300 depicting adjustment of electronic components based on presets established for a passenger. As indicated in FIG. 3, a passenger located in the rear portion of the vehicle swipes the end user device (e.g., a smart phone) on an NFC device 304 that is associated with the rear seat of the vehicle (310). A reader of the NFC device 304 receives a signal from the end user device 302 (312). The NFC device 304 communicates its unique identifier to the vehicle network 306 and a secure validation process is implemented between the NFC device 304 and the vehicle network 306 (314). The NFC device 304, in turn, sends a signal to the end user device 302 to perform a validation between the vehicle network 306 and the end user device 302 (316), and the end user device 302 responds with a confirmation (318). The NFC device 304 transmits the confirmation information to the vehicle network 306 (320). The end user device 302 then sends a request to the NFC device 304 to initiate the user-configured settings of various electronic components of the vehicle (322). The NFC device 304 sends the request onto the vehicle network 306 (324), and the vehicle network 306 forwards the request on to the central controller 308 (326), which forwards the request onto the corresponding electronic control units based on the electronic components identified from the settings. As shown in FIG. 3, for example, audio presets (328), HVAC presets (330), and rear seat entertainment (RSE) presets (332) are involved in the request. The corresponding electronic control units (e.g., associated with electronic components 112, 114, 116, and 118) implement the changes to the corresponding electronic components based on the presets (334).

FIG. 4 illustrates a sequence diagram 400 depicting the selection of a passenger's end user device 402 from which to stream music. As shown in FIG. 4, a passenger located in the rear portion of the vehicle swipes the end user device 402 (e.g., a smart phone) on an NFC device 404 that is associated with the passenger's seating location (410). A reader of the NFC device 404 receives a signal from the end user device 402 (412). The NFC device 404 communicates its unique identifier to the vehicle network 406 and a secure validation process is implemented between the NFC device 404 and the vehicle network 406 (414). The NFC device 404, in turn, sends a signal to the end user device 402 to perform a validation between the vehicle network 406 and the end user device 402 (416), and the end user device 402 responds with a confirmation (418). The NFC device 404 forwards the confirmation over the vehicle network 406 (420). The central controller 408 sends a connect request to the end user device 402 using wireless communication technologies, such as Bluetooth low energy protocols (422). The end user device 402 connects with the central controller 408 (424), followed by streaming music from the device 402 to the central controller 408 (426). The central controller 408, in turn, forwards the music to the entertainment system 116, which presents the music through the audio components of the entertainment system 116 (428).

The logic 110 may further be configured for enabling hands free calling between end user devices. The process may be implemented the same as that described above with respect to FIG. 4 except once the end user device 402 is connected with the central controller 408, the end user device 402 is ready to initiate a hands free call, and the communication received at the end user device 402 is transmitted wirelessly via the hands-free calling component of the vehicle.

Technical effects of the invention include in-vehicle functions implemented using short-range communications. The in-vehicle functions provide the ability to identify a particular operator or passenger of a vehicle and to initiate directed functions through the vehicle without passenger input. The directed functions are implemented using short-range wireless technologies, such as near field communications (NFC) or Bluetooth low energy communications. The directed functions include adjusting various electronic components of the vehicle according to known passenger preferences. The directed functions may also include enabling a passenger's end user device to stream music from the end user device to the vehicle's entertainment system. The directed functions may also include enabling passenger end user devices to initiate hands free calling.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A system, comprising:
  a plurality of location devices disposed in a vehicle, each of the location devices embedded in a respective vehicle seat of the vehicle;
  a wireless communications interface coupled to each of the location devices, each of the location devices is configured to communicate, via the wireless communications interface, with end user devices of occupants, if any, that are present in the corresponding vehicle seats;
  vehicle electronic components communicatively coupled to a vehicle network, each of the vehicle electronic components configured to provide a function that is independently directed to a corresponding vehicle seat;
  a central controller of the vehicle, the central controller including a computer processor, the central controller communicatively coupled to the location devices and the vehicle electronic components over the vehicle network; and
  logic executable by the computer processor, the logic configured to implement:
    receiving a unique identifier of one of the location devices, the unique identifier identifying a location in the vehicle in which the one of the location devices is disposed;
    validating the one of the location devices and an end user device of an occupant present in the vehicle seat corresponding to the one of the location devices in response to activation of the location device by the end user device via the communications interface;
    receiving a request from the end user device to implement end user-configured settings for at least one of the vehicle electronic components that services the location in the vehicle corresponding to the location device associated with the unique identifier; and
    activating the at least one of the vehicle electronic components based on the end user-configured settings.

2. The system of claim 1, wherein the wireless communications interface includes near field communications-enabled components.

3. The system of claim 1, wherein the vehicle includes a display device and the logic is further configured to implement:
  prompting the occupant, as an end user, to select settings via the display device for at least one of the vehicle electronic components of the vehicle;
  storing the settings as the end-user configured settings; and
  assigning a user identification for the end user with the end-user configured settings.

4. The system of claim 1, wherein the vehicle electronic components include at least one of:
  a vehicle seating component;
  a heating, air-conditioning, and ventilation system component;
  an entertainment system component; and
  a lighting component.

5. The system of claim 1, wherein activating the at least one of the vehicle electronic components includes streaming music from the end user device to an entertainment system of the vehicle, the entertainment system comprising the at least one of the vehicle electronic components.

6. The system of claim 1, wherein activating the at least one of the vehicle electronic components includes enabling a hands-free calling component of the vehicle by transmitting a communication from the end user device to the hands-free calling component.

7. A method, comprising:
receiving, at a computer processor, a unique identifier of a location device disposed in a vehicle, the location device being one of a plurality of location devices in the vehicle, each of the location devices embedded in a respective vehicle seat and including a wireless communications interface, the unique identifier identifying a location in the vehicle in which the location device is disposed;
validating, by the computer processor, the location device and an end user device of an occupant present in a vehicle seat corresponding to the location device, the validating implemented in response to activation of the location device by the end user device via the communications interface;
receiving, by the computer processor, a request from the end user device to implement end user-configured settings for at least one vehicle electronic component of a plurality of vehicle electronic components that service the location in the vehicle corresponding to the location device associated with the unique identifier; and
activating the at least one vehicle electronic component based on the end user-configured settings.

8. The method of claim 7, wherein the wireless communications interface includes near field communications-enabled components.

9. The method of claim 7, wherein the vehicle includes a display device, the method further comprising:
prompting the occupant, as an end user, to select settings via the display device for the at least one vehicle electronic component of the vehicle;
storing the settings as the end-user configured settings; and
assigning a user identification for the end user with the end-user configured settings.

10. The method of claim 7, wherein the at least one vehicle electronic component includes at least one of:
a vehicle seating component;
a heating, air-conditioning, and ventilation system component;
an entertainment system component; and
a lighting component.

11. The method of claim 7, wherein activating the at least one vehicle electronic component includes streaming music from the end user device to an entertainment system of the vehicle, the entertainment system comprising the at least one electronic component.

12. The method of claim 7, wherein activating the at least one vehicle electronic component includes enabling a hands-free calling component of the vehicle by transmitting a communication from the end user device to the hands-free calling component.

13. A computer program product, the computer program product comprising a non-transitory storage medium having computer program instructions embodied thereon, which when executed by a computer, cause the computer to implement a method, the method comprising:
receiving a unique identifier of a location device disposed in a vehicle, the location device being one of a plurality of location devices in the vehicle, each of the location devices embedded in a respective vehicle seat and including a wireless communications interface, the unique identifier identifying a location in the vehicle in which the location device is disposed;
validating the location device and an end user device of an occupant present in a vehicle seat corresponding to the location device, the validating implemented in response to activation of the location device by the end user device via the communications interface;
receiving a request from the end user device to implement end user-configured settings for at least one vehicle electronic component of a plurality of vehicle electronic components that services the location in the vehicle corresponding to the location device associated with the unique identifier; and
activating the at least one vehicle electronic component based on the end user-configured settings.

14. The computer program product of claim 13, wherein the wireless communications interface includes near field communications-enabled components.

15. The computer program product of claim 13, wherein the vehicle includes a display device, the method further comprising:
prompting the occupant, as an end user, to select settings via the display device for the at least one vehicle electronic component of the vehicle;
storing the settings as the end-user configured settings; and
assigning a user identification for the end user with the end-user configured settings.

16. The computer program product of claim 13, wherein the at least one vehicle electronic component includes at least one of:
a vehicle seating component;
a heating, air-conditioning, and ventilation system component;
an entertainment system component; and
a lighting component.

17. The computer program product of claim 13, wherein activating the at least one vehicle electronic component includes streaming music from the end user device to an entertainment system of the vehicle, the entertainment system comprising the at least one electronic component.

18. The system of claim 1, wherein the user-configured settings are stored in the location devices.

* * * * *